United States Patent
Nolten et al.

(10) Patent No.: US 9,676,017 B2
(45) Date of Patent: Jun. 13, 2017

(54) METHOD FOR THE ROLLER-STRAIGHTENING OF CRANKSHAFTS

(75) Inventors: Hans Nolten, Erkelenz (DE); Heinz Josef Brunen, Erkelenz (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 877 days.

(21) Appl. No.: 13/977,429

(22) PCT Filed: Dec. 22, 2011

(86) PCT No.: PCT/DE2011/002186
§ 371 (c)(1),
(2), (4) Date: Jan. 9, 2014

(87) PCT Pub. No.: WO2012/092920
PCT Pub. Date: Jul. 12, 2012

(65) Prior Publication Data
US 2014/0130561 A1 May 15, 2014

(30) Foreign Application Priority Data
Dec. 23, 2010 (DE) ......... 10 2010 056 616

(51) Int. Cl.
*B21D 15/00* (2006.01)
*B21D 3/16* (2006.01)
(Continued)

(52) U.S. Cl.
CPC ........... *B21D 3/16* (2013.01); *B21H 7/185* (2013.01); *F16C 3/06* (2013.01)

(58) Field of Classification Search
CPC . B21D 3/16; B21D 15/06; B21D 3/02; B21D 3/10; B21H 7/185; B21C 51/00
(Continued)

(56) References Cited

U.S. PATENT DOCUMENTS 3,948,076 A * 4/1976 Eitel ............. B21D 3/10
29/6.01
4,327,568 A 5/1982 Berstein
(Continued)

FOREIGN PATENT DOCUMENTS

DE    3037688 C2    12/1982
DE    2920889 C2    6/1983
(Continued)

OTHER PUBLICATIONS

International Search Report and Written Opinion of the International Searching Authority for PCT/DE2011/002186 (in English), mailed May 31, 2012; ISA/EP.
(Continued)

*Primary Examiner* — David B Jones
(74) *Attorney, Agent, or Firm* — Harness, Dickey & Pierce, P.L.C.

(57) ABSTRACT

The invention concerns a process for roll straightening crankshafts (8, 8') using crankshaft deep rolling tools (1 to 7), in particular work rollers (18,19) which, while the crankshaft (8, 8') is rotated about its axis of rotation (21), are pressed into the recesses (14 to 17) or radii that delimit the bearing pins (Hi, Pi) on either side with a roll straightening force (27, 30) that constantly fluctuates around the circumference of a bearing pin ($H_1$ to $H_5$, $P_1$ to $P_4$). Roll straightening is carried out by determining the individual vector (34) of the runout by size and direction (35) at each main bearing (Hi) of the crankshaft (8, 8'). The largest (45) or resulting vector (25) is determined from the individual vectors (34), then the main bearing pins (Hi) and crankpins (Pi) of the crankshaft (8, 8') are roll straightened with a roll straightening force (27, 30, 49, 50) the size (25) and direction (26) of the largest (45) or resulting vector (25) of which
(Continued)

Figure 1:
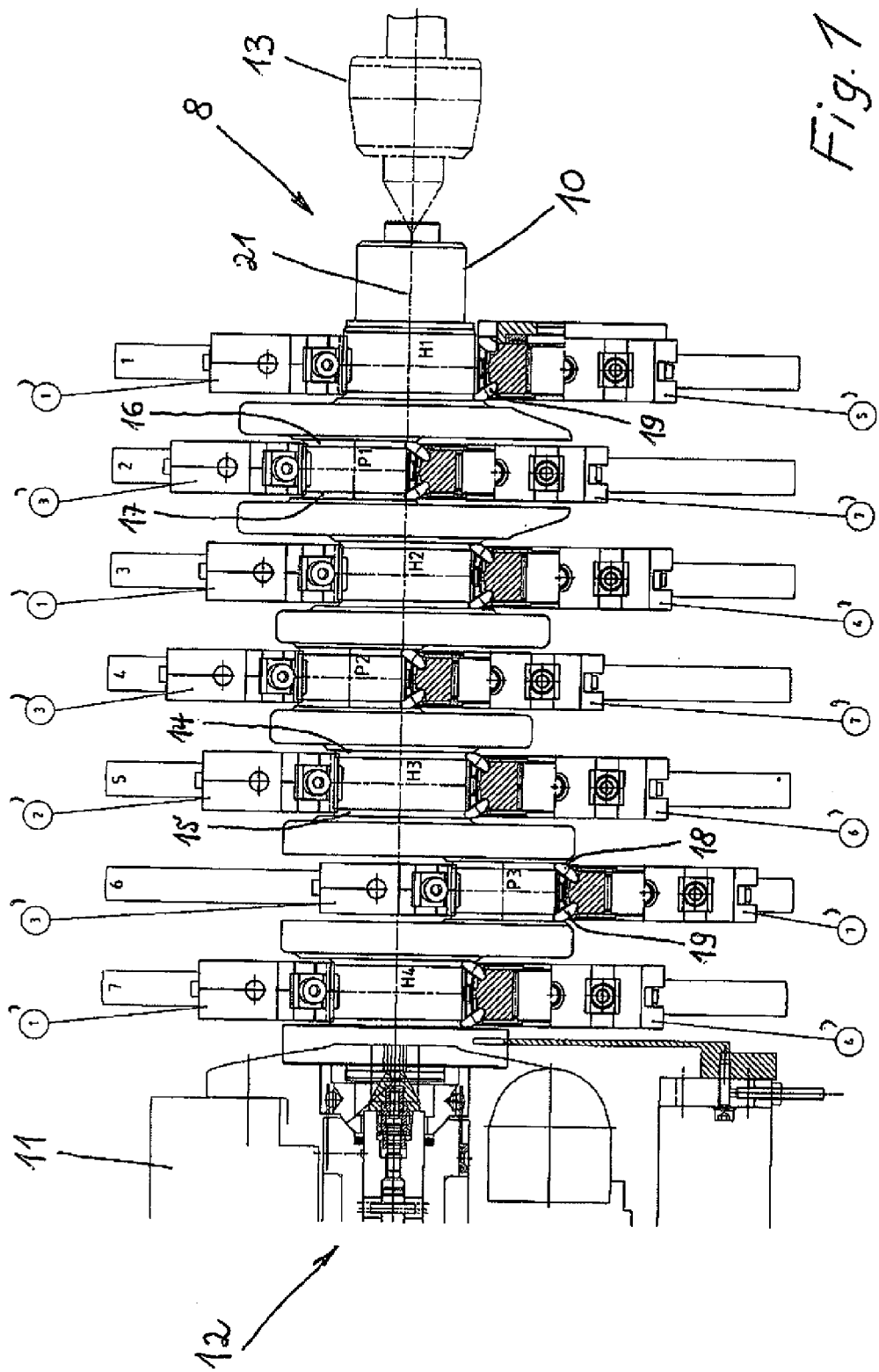

is between 0 and a multiple of the largest (45) or resulting vector (25).

13 Claims, 5 Drawing Sheets

(51) Int. Cl.
*B21H 7/18* (2006.01)
*F16C 3/06* (2006.01)

(58) Field of Classification Search
USPC .......................................................... 72/80
See application file for complete search history.

(56) References Cited

U.S. PATENT DOCUMENTS

| | | | |
|---|---|---|---|
| 4,561,276 A | 12/1985 | Berstein | |
| 4,860,566 A | 8/1989 | Augustin | |
| 5,001,917 A | 3/1991 | Berstein | |
| 5,235,838 A * | 8/1993 | Berstein | B21D 3/02 148/510 |
| 5,333,480 A * | 8/1994 | Berstein | B21D 3/02 72/110 |
| 6,393,885 B1 * | 5/2002 | Cadena | B24B 5/42 72/107 |
| 6,408,663 B1 * | 6/2002 | Pickren | B21C 51/00 29/888.08 |
| 6,651,474 B2 * | 11/2003 | Heimann | B24B 49/16 72/110 |
| 6,666,061 B2 * | 12/2003 | Heimann | B21H 7/185 72/10.1 |
| 6,895,793 B2 * | 5/2005 | Heffron | B21H 7/185 72/110 |
| 7,188,497 B2 * | 3/2007 | Mella | B21D 3/16 72/110 |
| 7,487,657 B2 * | 2/2009 | Steffens | B21D 15/06 72/101 |
| 8,020,293 B2 * | 9/2011 | Naumann | B21H 7/185 29/558 |
| 2002/0069689 A1 | 6/2002 | Heffe | |
| 2009/0116921 A1 * | 5/2009 | Naumann | B21H 7/185 409/131 |
| 2014/0130561 A1 * | 5/2014 | Nolten | B21H 7/185 72/80 |

FOREIGN PATENT DOCUMENTS

| | | |
|---|---|---|
| DE | 8801000 U1 | 5/1988 |
| DE | 10060219 B4 | 12/2004 |
| DE | 10202564 B4 | 8/2005 |
| EP | 0275876 A2 | 7/1988 |
| JP | S59101228 A | 6/1984 |

OTHER PUBLICATIONS

International Preliminary Report on Patentability (Chapter 1) for PCT/DE2011/002186, issued Jun. 25, 2013; ISA/EP.

* cited by examiner

METHOD FOR THE ROLLER-STRAIGHTENING OF CRANKSHAFTS

CROSS-REFERENCE TO RELATED APPLICATIONS

This application is a U.S. National Stage of International Application No. PCT/DE2011/002186, filed on Dec. 22, 2011 and published in German as WO/2012/092920 on Jul. 12, 2012. This application claims priority to German Application No. 10 2010 056 616.0, field on Dec. 23, 2010. The disclosures of the above applications are incorporated herein by reference.

FIELD

The invention concerns a process for roll straightening of crankshafts using crankshaft deep rolling tools, in particular for straightening work rollers that, while the crankshaft turns on its axis, are pressed with a roll straightening force that fluctuates constantly around the circumference of a bearing pin into the recesses or radii that delimit said pin on both sides

BACKGROUND

A process for roll straightening of crankshafts has been detailed in DE 30 37 688 C2. In accordance with this process, a crankshaft from a series that is in line for rolling is deep rolled with a constant force of F0, which corresponds to approx ⅓ of the minimum deep rolling force required to attain the desired fatigue strength. Once this is complete, the crankshaft is removed and the curve and size of the angle widening that has occurred are measured. Roll straightening is then performed using the appropriate machine setting at a force of F1, the curve of which across the crankshaft's angle of rotation is approximately proportional to the ratio of the largest angle widening to the local angle widening. As such, in accordance with the established process, the runout of the crankshaft, which it receives as a result of the deep rolling, is measured against the angle widenings of the crank arm. This type of measurement is complicated and imprecise. Furthermore, with the established process it is only ever possible to straighten a certain series, i.e. a pre-defined number of crankshafts of the same type. To this end, "roll straightening tables" have been drawn up in order to ensure that each crankshaft in the series lined up for rolling is always roll straightened according to the same pattern. This requires a high consistency of production for the crankshafts that are to be deep rolled. Deviations in individual crankshafts cannot be taken into account with this model. Furthermore, as stated above, the deep rolling force constantly fluctuates over the curve of the circumference of the bearing pin that is line up for rolling. The constant fluctuation between minimum and maximum deep rolling force protects the machine and tools.

Furthermore, allowing oscillation of the deep rolling force is established in DE 29 20 889 C2.

SUMMARY

This section provides a general summary of the disclosure and is not a comprehensive disclosure of its full scope or all of tis features.

A process for deep rolling and roll straightening one of a series of crankshafts of the same type, whereby the vectors of the bends in the crankshaft caused by the deep rolling are taken into account, has been established in DE 102 02 564 B4. This process works as follows:

Starting at one end of a first crankshaft:
The first bearing point is deep rolled with a first deep rolling force
The vectors of the bends for this are measured at all the main bearings
All the other crankshaft bearing points are deep rolled one after the other using the same deep rolling force
The respective vectors of the runouts for this are measured at all main bearings
A matrix H is generated using the vectors of the measurements Once again, the disadvantage with the established process is that the data from measurements taken from the first in a series of crankshafts is used to deep roll all the other crankshafts in the series. The established process is not suited to individual roll straightening of individual crankshafts. Furthermore, the generation of matrices results in a very large amount of calculation work for deep rolling and roll straightening. This requires additional calculation capacity in the machine control unit, thus making the machine control unit larger and more expensive.

In contrast to this, the aim of this new invention is to propose a roll straightening process that allows individual straightening of each individual crankshaft with minimal calculation work for the control unit. This will allow high-precision, efficient machining of small series, taking into account differences caused by the metallic composition and prior machining for each individual crankshaft.

The solution works as follows:
The individual vector of the runout is defined by size and direction at each of the crankshaft's main bearings
The largest or resulting vector is calculated from the individual vectors
The main pins and crankpins of the crankshaft are deep rolled with a roll straightening force, the size and direction of the largest or resulting vector of which is between the values 0 and a multiple of the size of the largest or resulting vector.

Since the greatest runout on a crankshaft can mainly only be determined at a single main bearing pin while the runouts on the other main bearing pins deviate from this value, it is beneficial to alter the size of the roll straightening force from bearing pin to bearing pin. This means that the main bearing pin and crankpin adjacent to the flange and the crankshaft pin are machined using a different roll straightening force as the main bearing pin and crankpin adjacent to the bearing pin with the largest runout.

It is advantageous to exert the greatest roll straightening force on the bearing pin with the largest runout.

The process is also suited to in-process roll straightening, e.g. during deep rolling. It is not necessary to wait for the deep rolling result before carrying out the roll straightening operation; instead, data can be collected during deep rolling to allow combined deep rolling and roll straightening.

The vector of the greatest runout is measured at the main bearing pin either during or after deep rolling. The vector of the resulting crankshaft runout is determined during or after deep rolling by adding together the individual runout vectors.

It is also possible to divide the entire axial length of a crankshaft into sections and roll straighten each section separately. This type of procedure is useful when the task requires roll straightening of crankshafts with an S runout.

S runouts are more common on the crankshafts of multi-cylinder V-motors, for example.

As an example, a setup like the one established in DE 100 60 219 B4 is suitable for determining the runout of crankshafts. The setup has a multitude of probes, which are lowered onto the crankshaft's main bearing pins in order to measure the individual runouts. The measurements are transmitted immediately to the machine control unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention is described in detail below using a design example. The following figures each show a scaled down section of the equipment.

FIG. 1: shows a longitudinal section through a deep rolling machine for crankshafts.

Figure 2:
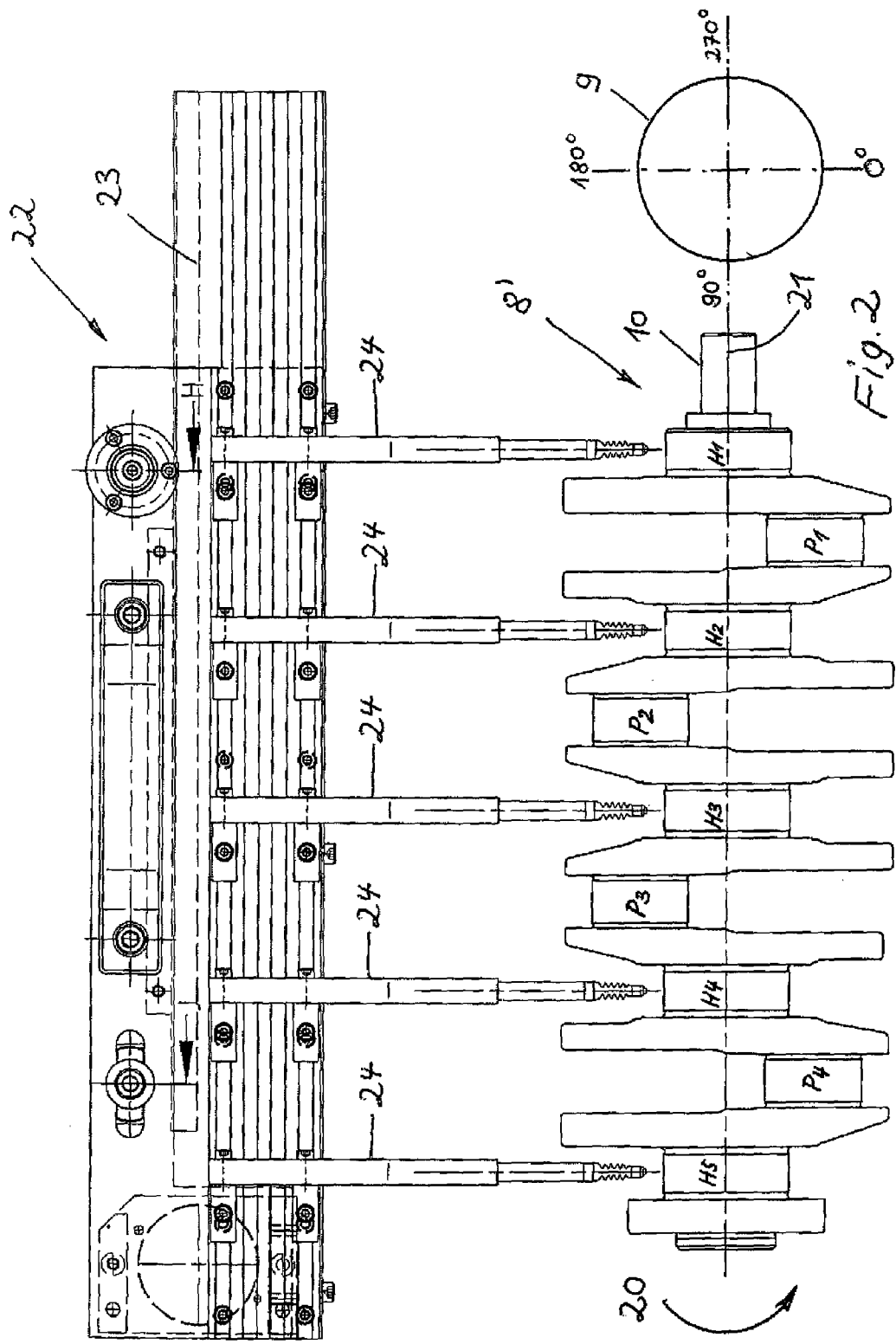

FIG. 2: shows a measuring device for determining the runouts, front view.

Figure 3:
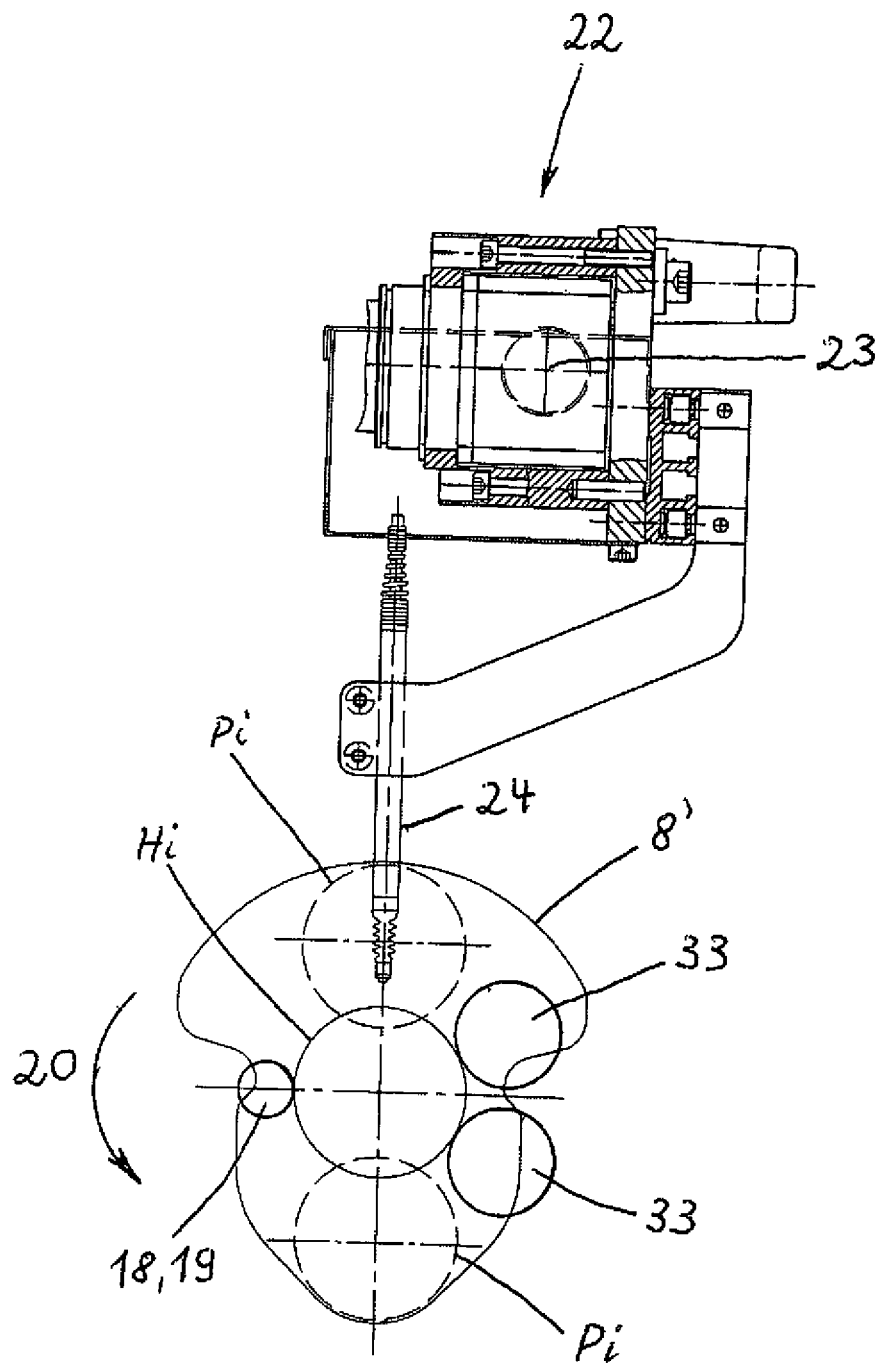

FIG. 3: shows the same measuring device as in FIG. 2, side view.

Figure 4:
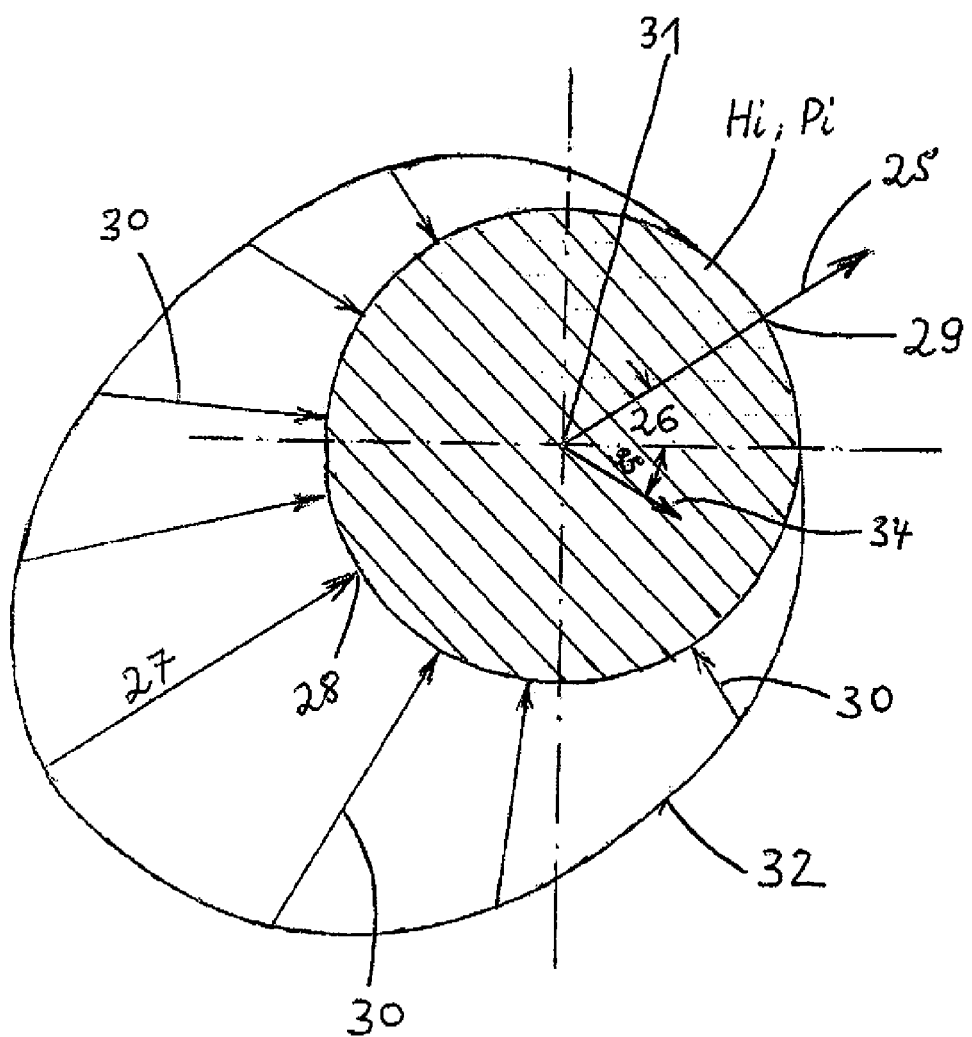

FIG. 4: shows a section through any main bearing pin (rear) of a crankshaft, showing the resulting runout and the roll straightening force.

Figure 5:
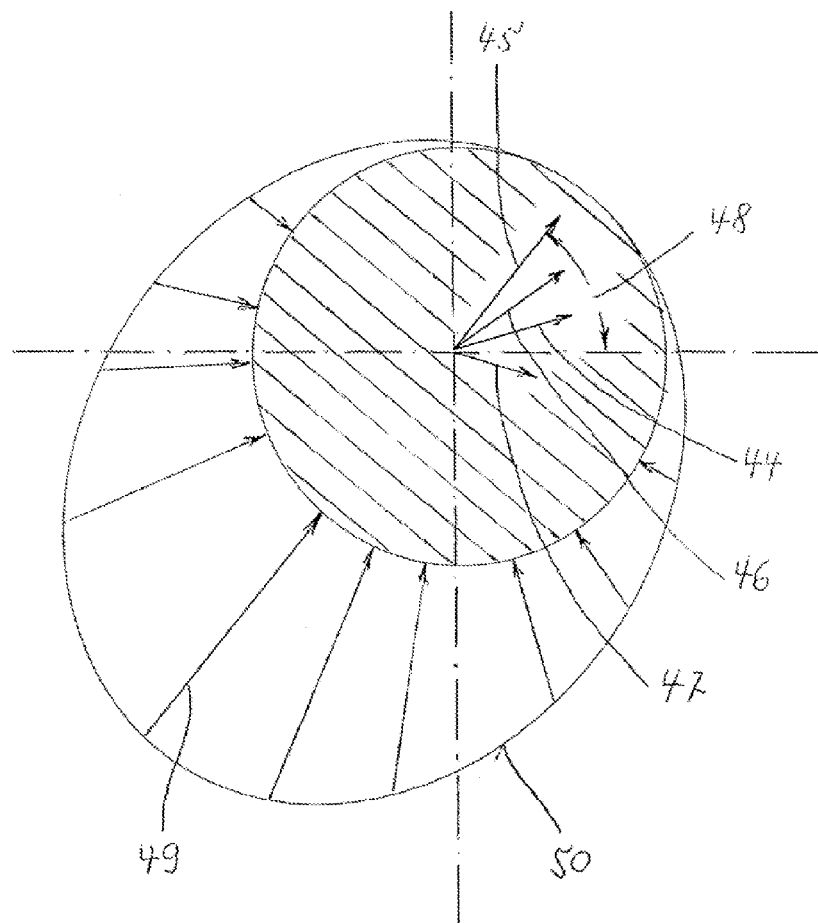

FIG. 5: shows a section through any main bearing pin (rear) of a crankshaft, showing the maximum runout and the roll straightening force.

Corresponding reference numerals indicate corresponding parts throughout the several views of the drawings.

DETAILED DESCRIPTION

Example embodiments will now be described more fully with reference to the accompanying drawings.

In order to measure the "bend" in a crankshaft 8, 8', its runout is measured. For the runout measurement, the largest deflection (μm) and the direction (°) of the largest deflection are measured at the main bearings H1-H5. As an example, if the result were 268/177, the runout would be 268 μm at an angle of 177°. The angle measurement refers to the coordinates system 9 or the crankshaft 8, 8', and is defined the same way for all crankshaft types. The direction of the highest-quality pin bearing P4, counted from pin 10, is 0°. The direction of rotation 20 of the crankshaft 8, 8' during deep rolling, facing the chuck 11 of the deep rolling machine 12, is anti-clockwise. The angle count direction is clockwise in relation to the workpiece crankshaft 8, 8'.

In FIG. 1, for example, a 3-cylinder crankshaft 8 is clamped in a deep rolling machine 12 between the chuck 11 and the centre sleeve 13. At main bearing pins H1. H2. H3 and H4, recesses 14 and 15 are deep rolled using crankshaft deep rolling tools 1, 3, 5 and 7. At crankpins P1, P2 and P3, recesses 16 and 17 are deep rolled using crankshaft deep rolling tools 2, 4 and 6. Each crankshaft deep rolling tool 1 to 7 comprises a support roller head 1', 2', 3' with support rollers 33 (FIG. 3) and a deep rolling head 4', 5', 6' and 7'. Work rollers 18 and 19 penetrate recesses 14 and 15 during deep rolling of the main bearings H1 to H4, and recesses 16 and 17 during deep rolling of the pin bearings P1 to P3.

During deep rolling, the crankshaft 8 is rotated around its main axis of rotation 21 in the direction of the arrow 20 by the chuck 11.

In FIG. 3, the position of the work rollers 18 and 19, and of support rollers 33, during deep rolling and roll straightening corresponds to that during in-process deep rolling and roll straightening.

The runout can be measured using a measuring device 22 for example, which can be swiveled around a swivel axis 23. The measuring device 22 has several measuring sensors 24 arranged in a line, which can be lowered onto the main bearing pins H1 to H5, of a 4-cylinder crankshaft 8', for example, by swiveling the measuring device 22 about the swivel axis 23. Turning the crankshaft 8' in direction 20 determines the individual runouts 34 to 38 on the main bearings H1 to H5 by size and direction, angle 39 to 42.

The addition of the vectors that takes place in the machine control unit (not shown) is used to determine the resulting runout 25 by size and direction 26 from the individual runouts 34 to 38.

The resulting runout 25 then triggers a roll straightening force 27 on the crankshaft deep rolling tools 1 to 7, the size of which matches the resulting vector 25 and its direction 26. The roll straightening forces 27 and 30 are always directed towards the centre 31 of the bearing pin in question H1 to H5 or P1 to P4. At the position 29 of the bearing pins Hi and Pi opposite the point 28 at which the largest roll straightening force 27 is applied, the roll straightening force 30 is equal to "0", for example. Around the circumference of the bearing pins Hi to Pi, the roll straightening forces 30 drop continuously, as can be seen from the outline 32. In contrast to the example in FIG. 4, where the roll straightening force at position 29 assumes the value "0", it can also assume a finite value at the same point, which is a fraction of the maximum roll straightening force 27.

A simpler process than that described in the example above is also a perfectly feasible way of achieving the goal. Such a process is illustrated in FIG. 5. Here, either during or after deep rolling, the individual runouts 44, 45, 46 and 47 are measured at the individual main bearing pins H1, H2, H3 and H4. The largest of these by size and direction 48 is runout 45. With a roll straightening force 49 to match this individual runout 45, the crankshaft 8,8' is now roll straightened at the main bearing pin H2, for example, or at a crankpin P1 or P2 adjacent to the main bearing pin H2. This roll straightening force 49 also assumes values between a multiple of the maximum runout 45 and "0". The force curve around the circumference is shown by line 50.

As described above, the maximum runout 45 is calculated by the machine control unit. The preferred type of procedure (according to either FIG. 4 or FIG. 5) is determined in advance by means of a test. However, a complex machine control unit can also calculate and apply the preferred procedure in-process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for roll straightening a crankshaft during or after a deep rolling process using deep rolling tools, wherein a work roller is pressed into a recess on a side of a bearing journal of the crankshaft with a straightening force, the method comprising:
- determining an individual vector (44, 45, 46, 47) of a runout for each bearing journal (Hi, Pi) of the crankshaft (8, 8');
- determining a largest vector (45) from the individual vectors (44, 45, 46, 47) according to a size value and a direction (48); and then
- applying a straightening force (46, 50) to each bearing journal (Hi, Pi) of the crankshaft (8, 8');
- wherein a direction of the straightening force (46, 50) lies in the direction (48) of the largest vector (45);
- wherein a size value of the straightening force (46, 50) continually changes as the crankshaft is rotated through 360 degrees around an axis of rotation; and
- wherein the size value of the straightening force (46, 50) varies between 0 and a multiple value of the size value of the largest vector (45).

2. The method according to claim 1, wherein the size value of the straightening force (27, 30 and 49, 50) is changed from one bearing journal (Hi, Pi) to another bearing journal (Hi, Pi) of the crankshaft.

3. The method according to claim 1, wherein the roll straightening is performed during the deep rolling process.

4. The method according to claim 1, wherein the crankshaft (8, 8') is divided up into a plurality of individual length sections along an axial length of the crankshaft; and
wherein each the individual length section is roll straightened separately.

5. A method for roll straightening a crankshaft during or after a deep rolling process using deep rolling tools, wherein a work roller is pressed into a recess on a side of a bearing journal of the crankshaft with a straightening force, the method comprising:
- determining an individual vector (44, 45, 46, 47) of a runout for each bearing journal (Hi, Pi) of the crankshaft (8, 8');
- determining a resulting vector (25) from the individual vectors (34, 35, 36, 37, 38) according to a size value and a direction (26); and then
- applying a straightening force (46, 50) to each bearing journal (Hi, Pi) of the crankshaft (8, 8');
- wherein a direction of the straightening force (46, 50) lies in the direction (26) of the resulting vector (25);
- wherein a size value of the straightening force (27, 30) continually changes as the crankshaft is rotated through 360 degrees around an axis of rotation; and
- wherein the size value of the straightening force (27, 30) varies between 0 and a multiple value of the size value of the resulting vector (25).

6. The method according to claim 5, where the size of the straightening force (27, 30 and 49, 50) is changed from one bearing journal (Hi, Pi) to another bearing journal (Hi, Pi) of the crankshaft.

7. The method according to claim 5, wherein the roll straightening is performed during the deep rolling process.

8. The method in accordance with claim 5, wherein the resulting vector (25) is determined by vectorial addition of the individual vectors (34, 35, 36, 37, 38).

9. The method according to claim 5, wherein the crankshaft (8, 8') is divided up into a plurality of individual length sections along an axial length of the crankshaft; and
wherein each the individual length section is roll straightened separately.

10. A method for roll straightening a crankshaft, the crankshaft comprising a plurality of bearings along a length of the crankshaft and a longitudinal axis, the method employing deep rolling tools comprising a support roller head including support rollers, a deep rolling head and work rollers, the method comprising:
- rotating the crankshaft about the longitudinal axis;
- measuring the size and direction of a runout on each of the plurality of bearings to determine a corresponding runout vector for each of the plurality of bearings;
- determining a size and direction of a resultant runout vector from a sum of each of the runout vectors for each of the plurality of bearings;
- for each of the plurality of bearings, applying at a first point located on a circumference of the bearing, a roll straightening force being directed toward the first longitudinal axis, the roll straightening force having a first size at least equal to the size of the resultant runout vector and having a direction matching the direction of the resultant runout vector; and
- for each of the plurality of bearings, continuously reducing the size of the roll straightening force applied to the bearing as the crankshaft rotates about the longitudinal axis such that, at a second point located on the circumference of the bearing that is 180 degrees from the first point, the roll straightening force applied to the bearing has a second size equal to one of zero and a fraction of the size of the resultant runout vector.

11. The method according to claim 10, further comprising, for each of the plurality of bearings, continuously increasing the size of the roll straightening force applied to the bearing from the second size to the first size as the crankshaft continues to rotate about the longitudinal axis from the second to the first point.

12. The method according to claim 11 wherein the first size is greater than the size of the resultant runout vector; and
wherein the second size is equal to zero.

13. The method according to claim 11 wherein the first size is equal to the size of the resultant runout vector; and
wherein the second size is equal to zero.

* * * * *